(12) United States Patent
Stoyanov

(10) Patent No.: US 9,975,182 B2
(45) Date of Patent: May 22, 2018

(54) CUTTING TOOL MADE BY ADDITIVE MANUFACTURING

(71) Applicant: Pantcho Stoyanov, Pittsburgh, PA (US)

(72) Inventor: Pantcho Stoyanov, Pittsburgh, PA (US)

(73) Assignee: KENNAMETAL INC., Latrobe, PA (US)

( * ) Notice: Subject to any disclaimer, the term of this patent is extended or adjusted under 35 U.S.C. 154(b) by 131 days.

(21) Appl. No.: 14/710,644

(22) Filed: May 13, 2015

(65) Prior Publication Data

US 2016/0332236 A1    Nov. 17, 2016

(51) Int. Cl.
| | |
|---|---|
| *B23B 27/14* | (2006.01) |
| *C22C 29/08* | (2006.01) |
| *C22C 29/06* | (2006.01) |
| *B22F 3/105* | (2006.01) |
| *B22F 3/15* | (2006.01) |
| *B23C 5/20* | (2006.01) |
| *B23B 27/10* | (2006.01) |
| *B23B 51/02* | (2006.01) |
| *B22F 5/00* | (2006.01) |

(52) U.S. Cl.
CPC ............ *B23B 27/14* (2013.01); *B22F 3/1055* (2013.01); *B22F 3/15* (2013.01); *B23B 27/10* (2013.01); *B23B 51/02* (2013.01); *B23C 5/20* (2013.01); *C22C 29/067* (2013.01); *C22C 29/08* (2013.01); *B22F 2005/001* (2013.01); *B22F 2301/15* (2013.01); *B22F 2302/10* (2013.01); *B23B 2222/28* (2013.01); *B23B 2228/10* (2013.01); *B23C 2228/25* (2013.01)

(58) Field of Classification Search
CPC .......... B23B 27/14; B23B 27/10; B33Y 80/00
See application file for complete search history.

(56) References Cited

U.S. PATENT DOCUMENTS

| | | | | |
|---|---|---|---|---|
| 3,455,000 A | * | 7/1969 | Flaherty ................. | B23B 27/10 407/118 |
| 8,007,922 B2 | * | 8/2011 | Mirchandani .......... | B22F 7/062 175/425 |
| 2013/0223943 A1 | * | 8/2013 | Gey ........................ | B23B 51/06 408/59 |
| 2014/0298728 A1 | * | 10/2014 | Keshavan ............... | E21B 10/56 51/298 |
| 2015/0298222 A1 | * | 10/2015 | Ach ........................ | B23C 5/006 407/11 |

(Continued)

FOREIGN PATENT DOCUMENTS

| | | | | |
|---|---|---|---|---|
| EP | 0842722 A1 | * | 5/1998 | ............ B23B 27/10 |
| JP | 2005132672 A | * | 5/2005 | |

(Continued)

OTHER PUBLICATIONS

English translation of JP 2007-307659, Nov. 2007.*
English translation of JP 2005-132672, May 2005.*

*Primary Examiner* — Alan Snyder
(74) *Attorney, Agent, or Firm* — Larry R. Meenan

(57) ABSTRACT

A cutting tool made by an additive manufacturing process is disclosed. The cutting tool has an exterior surface and an enclosed interior cavity defined by one or more inwardly facing surfaces. The interior cavity may have internal supports such as a lattice or a honeycomb structure. The cutting tool may be an insert, drill or endmill with coolant holes.

20 Claims, 3 Drawing Sheets

(56) References Cited

U.S. PATENT DOCUMENTS

2016/0067785 A1* 3/2016 Wang .................... B23B 27/141
　　　　　　　　　　　　　　　　　　　　407/11
2016/0158855 A1* 6/2016 Kondameedi ........... B23P 15/34
　　　　　　　　　　　　　　　　　　　　407/11

FOREIGN PATENT DOCUMENTS

JP　　　　2007307659 A　*　11/2007
WO　　WO 2015182711 A1 *　12/2015　............. B23B 27/14

* cited by examiner

CUTTING TOOL MADE BY ADDITIVE MANUFACTURING

FIELD

The present invention relates to the production and design of metal cutting tools.

BACKGROUND

Metal cutting tools are typically made from cemented tungsten carbide or another suitable material, such as PCD, PcBN, high speed steel and other cermets. Cemented tungsten carbide components are made by pressing or extruding blend of WC, Co and possibly other materials into a green shape. The green shape is then sintered to compact and fuse the powder together. Cemented carbides are metal-matrix composites comprising carbides of one or more of the transition metals as hard particles dispersed and cemented in a binder of, for example, cobalt, nickel, and/or iron (or alloys of these metals). In this manner, the hard particles form a dispersed phase and the binder forms a continuous phase. Cemented carbides offer attractive combinations of strength, toughness, and abrasion/erosion (i.e., wear) resistance for use as cutting tools, including, for example, turning inserts and milling inserts. Among the different possible hard particle combinations, cemented carbides comprising tungsten carbide as the hard particle and cobalt as the binder phase are common choices for cutting tools for metalworking operations on difficult to machine materials, such as, for example, titanium and titanium alloys, nickel and nickel alloys, superalloys, stainless steels, and ductile iron.

Press and sinter or extrude and sinter technology limits the design of the final component to only those geometries that can be pressed or extruded. This can lead to inferior or unnecessary features incorporated into cemented carbide components including more material. One unnecessary feature is often the use of more material than is needed to make the component. Cemented tungsten carbide is an expensive material. There is a continuous need to reduce its use without compromising cutting tool quality or performance.

SUMMARY

In one form thereof, the invention is a cutting tool comprising an exterior surface and an enclosed interior cavity defined by one or more inwardly facing surfaces. The interior cavity may have internal supports such as a lattice or a honeycomb structure.

In another form thereof, the invention is a method of producing a cutting tool comprising producing a green cutting tool having an internal cavity from a starting powder using a binder jetting process, followed by debinding and sintering the cutting tool.

In another form thereof, the invention is a method of producing a cutting tool comprising the steps of producing a tool having an internal cavity from a starting powder using a selective laser sintering process.

Tools produced according to this invention may have improved the mechanical properties and wear resistance, decreased total weight through the elimination of unnecessary material, and decreased manufacturing time and costs. In addition, the light weight design of the tool will allow for more accurate tool paths in high speed operations due to the quicker reaction of the machinery. Additional benefits of this design include higher quality finished parts increased design flexibility.

These and other embodiments are described in greater detail in the detailed description which follows.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention. As used herein, the term cutting tool refers to a hard component used to remove material from a workpiece.

Figure 1:
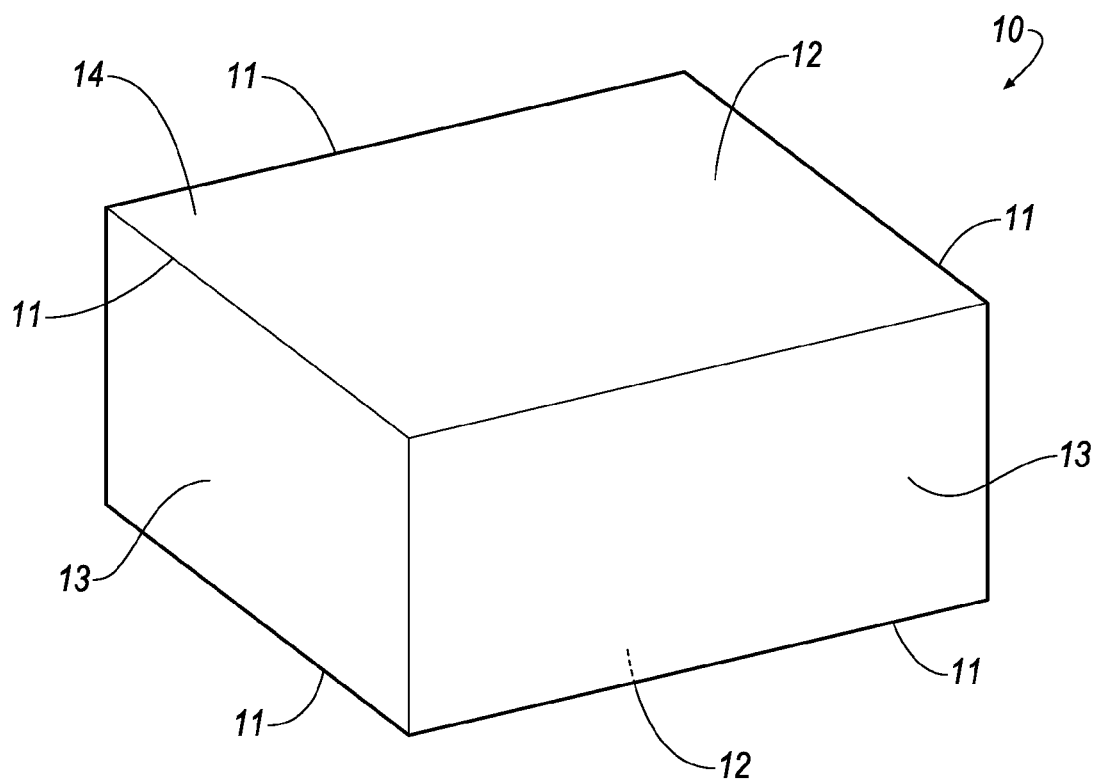
FIG. 1 is a perspective view of a cutting insert according to one embodiment of the present invention.

FIG. 1 illustrates a cutting insert 10 according to one embodiment of the present invention. In this embodiment, the cutting insert is in a generally rectangular form although it could be any desired shape suitable for metal cutting, for example, another insert style, an end mill or a drill. Moreover, the cutting insert 10 could have additional geometric shapes like chip breakers or holes on one or more of its surfaces. Cutting insert 10 has cutting edges 11 at the intersection of a rake face 12 and a flank face 13. An exterior surface 14 of the cutting tool 10 comprises the rake face 12, flank face 13 and cutting edges 11. Cutting inserts of this style are typically indexable and removably held in a toolholder for a turning or milling operations.

Figure 2:
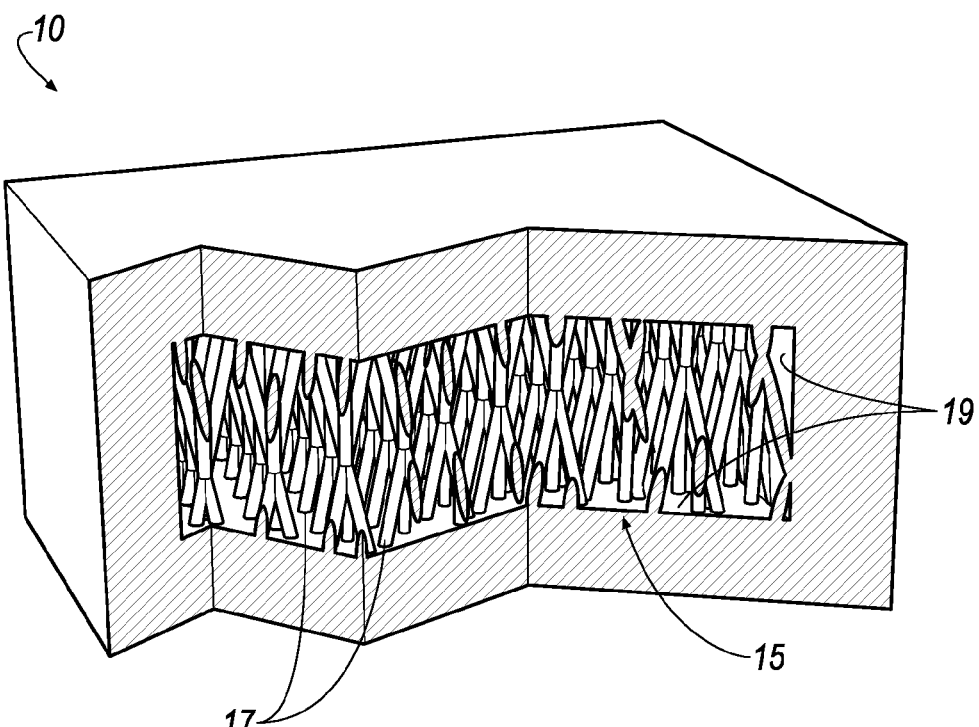
FIG. 2 is a cross-sectional view of the cutting insert of FIG. 1.

FIG. 2 is a cross-sectional view of the cutting insert 10 of FIG. 1. The cross-section reveals an interior cavity 15 within the insert 10. The interior cavity 15 is defined by one or more inwardly facing surfaces 19. A lattice structure 17 is incorporated to improve the mechanical properties of the cutting insert 10. The lattice structure 17 may be any suitable design that maintains the mechanical strength and integrity of the tool, for example, one or more interior walls may be added or a honeycomb structure may be incorporated. As used herein, the term "cavity" refers to an interior space within a tool bounded on all sides by inwardly facing surfaces.

Figure 3:
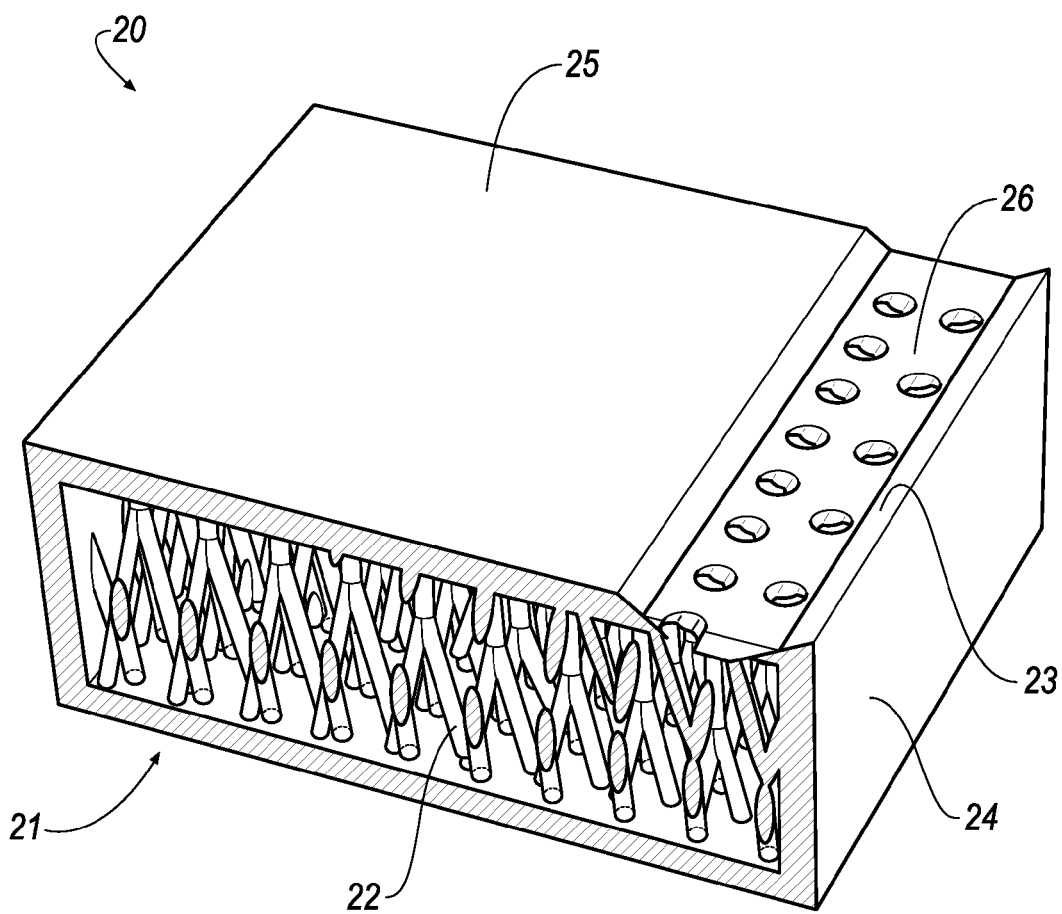
FIG. 3 is a sectional view of a cutting insert according to another embodiment of the present invention.

Referring now to FIG. 3, a cross-sectional view of a cutting insert 20 is shown according to another embodiment of the present invention. The cutting insert 20 has an interior cavity 21 with a supporting lattice structure 22. The cutting insert 20 has a cutting edge 23 at the intersection of a flank face 24 and a rake face 25. Within the rake face 25 and adjacent the cutting edge 23 are coolant discharge holes 26 extending from the interior cavity 21 to the rake face 25. In this embodiment, coolant, for example, water or cutting fluid, is delivered through a tool holder (not shown) and into a coolant inlet (not shown) incorporated into the bottom of the cutting insert 20. The bottom of the insert is the side opposite the rake face 25. Other embodiments may have the coolant inlet on a flank or rake face.

Figure 4:
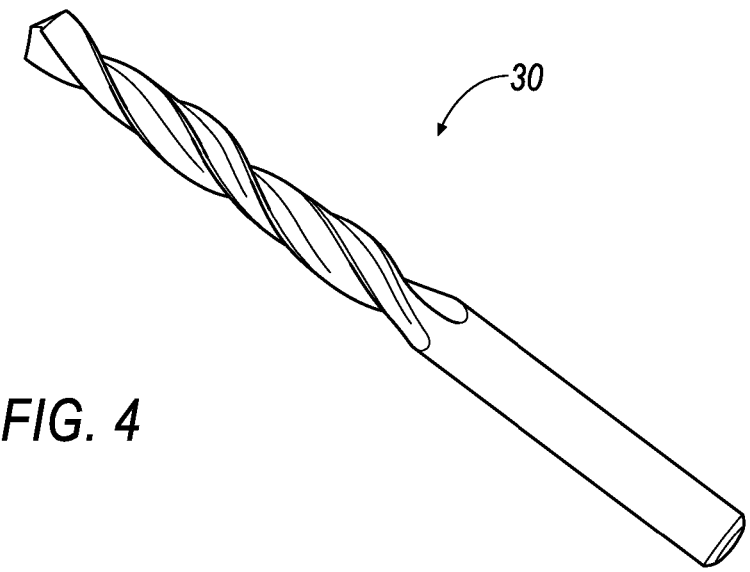
FIG. 4 is a perspective view of drill according to another embodiment of the present invention.
Figure 5:
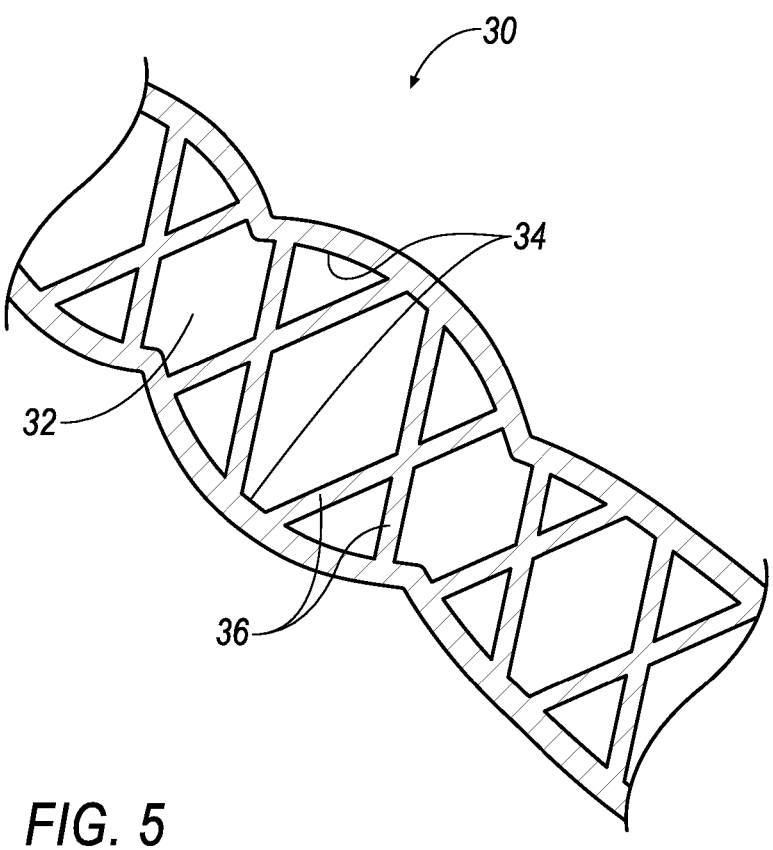
FIG. 5 is a cross-sectional view of the drill of FIG. 4.

FIG. 4 and FIG. 5 illustrate a drill 30 according to another embodiment of the present invention. FIG. 5 is a cross-sectional view of a central portion of the drill 30. The cross section is along a plane intersecting the longitudinal axis of the drill 30. The drill has a shank 31 at one end and a cutting tip 32 and cutting edges 33 at an opposite end. As shown in FIG. 5, the drill 30 has an interior cavity 34 defined by one or more inwardly facing surfaces 35. Lattice structures 36 provide mechanical support for the drill 30.

Cutting tools of the present invention are manufactured by means of additive manufacturing, for example, binder jetting, selective laser sintering (SLS), or selective laser melting (SLM). As used herein, "binder jetting" refers to the following method of producing a component: selectively spraying liquid binder onto a bed of powder based on a 3D model of a component, solidifying the binder and powder into a cross-section, depositing additional powder then binder to form the next layer of the object and repeating this process until the green component is finished. Subsequent to the binder jetting, the component is debound and sintered. In some embodiments, the cutting tool is hot isostatic pressed (HIP) at a temperature between 2000 and 3000° F. for a time period of between 30 and 500 minutes and a pressure of 10,000 to 30,000 psi to obtain a highly dense and reliable structure. Final density of the tool is at >95%, for example >99.5%.

Suitable powders include water and gas atomized powder comprising a hard particle component and a metallic binder component. Turning now to specific components, the hard particle phase can be present in the sintered cemented carbide article in any amount not inconsistent with the objectives of the present invention. In some embodiments, for example, the hard particles phase is present in an amount of at least 70 weight percent or at least 80 weight percent of the sintered cemented carbide article. The hard particle phase can also be present in an amount selected from Table I.

TABLE I

| Hard Particle Phase Content Wt. % Sintered Cemented Carbide Article |
| --- |
| 70-98 |
| 80-98 |
| 85-96 |
| 88-95 |
| 89-98 |
| 90-97 |

As described herein, the hard particle phase includes tungsten carbide. In some embodiments, the hard particle phase is formed solely of tungsten carbide. Alternatively, the hard particle phase can further include carbide, nitride and/or carbonitride of one or more metals selected from 20 Groups IVB, VB and VIB of the Periodic Table. For example, in some embodiments, the hard particle phase comprises at least one of tantalum carbide, niobium carbide, vanadium carbide, chromium carbide, zirconium carbide, hafnium carbide, titanium carbide and solid solutions thereof in addition to tungsten carbide. Additional metal carbide, nitride and/or carbonitride can be present in the hard particle phase in any amount not inconsistent with the objectives of the 25 present invention. In some embodiments, additional metal carbide, nitride and/or carbonitride is present in an amount of up to 50 wt. % of the hard particle phase. For example, additional metal carbide, nitride and/or carbonitride can be present in an amount of 1-10 wt. % of the hard particle phase. Further, the hard particle phase can generally exhibit an average grain size less than 30 µm. For example, the hard particle phase can have an average grain size less than 10 µm, such as 0.5-3 µm.

As described herein, the sintered cemented carbide article includes a metallic binder phase comprising one or more alloying additives and the balance of cobalt, nickel and/or iron. As used herein, "metallic binder" refers to the metallic component which softens during sintering and cements the hard particles together. Metallic binder is part of the powder blend which is used to create the green component. Generally, the metallic binder phase is present in an amount of 1-30 wt. % of the sintered cemented carbide article. In some embodiments, metallic binder phase is present in an amount selected from Table II.

TABLE II

| Metallic Binder Phase Content Wt. % Metallic Binder of Sintered Cemented Carbide |
| --- |
| 1-30 |
| 2-20 |
| 2-12 |
| 3-10 |
| 4-15 |
| 10-30 |

Alloying additive of the metallic binder phase comprises one or more metallic elements, non-metallic elements or solid solutions thereof. Metallic elements suitable for use as alloying additive include transition metals and aluminum. In some embodiments, transition metal alloying additive is selected from Groups IIIB-VIIm of the Periodic Table. For example, alloying additive can comprise one or more of tungsten, ruthenium, manganese, copper, rhenium, chromium, osmium and molybdenum. In some embodiments, metallic alloying additive exhibits 20 a hexagonal close-packed (hcp) crystalline structure. In other embodiments, metallic alloying additive has a cubic crystalline structure, such as face-centered cubic (fcc) or body-centered cubic (bcc). Alloying additive can also include one or more non-metallic elements. Nonmetallic alloying elements can selected from Groups IIIA-VA of the Periodic Table, such as boron, silicon, carbon and/or nitrogen. Generally, alloying additive is present in an amount up to 50 wt. % of the metallic binder phase. In some embodiments, for example, alloying additive is present in an amount of 10-30 wt. % or 30-50 wt. % of the metallic binder phase.

In some embodiments, a sintered cemented carbide article described herein further comprises a surface zone of alloy binder enrichment having maximum alloy binder content greater than the alloy binder content in the bulk of the sintered article. The zone of binder enrichment can extend inwardly from the sintered article surface. In some embodiments, alloy binder of the enrichment zone is stratified, exhibiting distinct layers of alloy binder. In other embodiments, the alloy binder is non-stratified. The sintered cemented carbide article can exhibit a surface zone of alloy binder enrichment on one or multiple surfaces.

Nonlimiting examples of binders that may be used with the inventive suspensions include binders such as ethylene glycol monomethyl ether, polyethylene glycol, polyvinyl alcohol (PVA), polyvinyl butyral (PVB), polyvinylpyrrolidone (PVP) and waxes. The concentration of the binder in a may be from about 5 to about 10 weight percent binder. Tools can be made with an ExOne binder jet printer utilizing a suitable binder and powder combination as described above.

In some embodiments, cutting tools described herein are coated with one or more refractory materials by PVD and/or CVD. In some embodiments, the refractory coating comprises one or more metallic elements selected from aluminum and metallic elements of Groups IVB, VB and VIB of the Periodic Table and one or more non-metallic elements selected from Groups IIIA, IVA, VA and VIA of the Periodic Table. For example, the refractory coating can comprise one or more carbides, nitrides, carbonitrides, oxides or borides of one or more metallic elements selected from aluminum and Groups IVB, VB and VIB of the Periodic Table. Additionally, the coating can be single-layer or multi-layer.

Further, cutting tools described herein can be subjected to one or more treatments such as polishing, blasting and/or etching. The surface treated sintered cemented carbide articles can remain in the uncoated state or a refractory coating described herein can be applied to the treated surfaces. Moreover, one or more layers of the refractory coating can be subjected a post-coat treatment such as polishing and/or blasting.

Additive manufacturing techniques enable a wholly enclosed cavity to be designed into a cutting tool. The cavity may additionally have lattice or other supports designed into the tool to increase its strength. Prior art press and sinter techniques are not capable of producing a wholly enclosed interior cavity. An enclosed cavity with lattice supports allows for design of the cutting tool with minimal material use while maintaining mechanical strength of the tool.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

That which is claimed is:

1. A cutting tool comprising:
an exterior surface and
an enclosed interior cavity defined by inwardly facing surfaces, the enclosed interior cavity comprising one or more lattice structures within and supporting the interior cavity, wherein the lattice structures comprise intersecting rod structures extending between two or more of the inwardly facing surfaces.

2. The cutting tool of claim 1, wherein the cutting tool comprises cemented tungsten carbide.

3. The cutting tool of claim 1, further comprising:
a rake face;
a flank face;
a cutting edge at the intersection of the rake face and flank face.

4. The cutting tool of claim 3, the rake face, a flank face or another surface containing a coolant inlet and wherein the rake face includes an array of coolant discharge holes adjacent to and along the cutting edge.

5. The cutting tool of claim 4, wherein the array is a two-dimensional array.

6. The cutting tool of claim 1, further comprising a PVD or CVD coating on at least the rake or flank face.

7. The cutting tool of claim 1, wherein the cutting tool is a cutting insert.

8. A cutting tool comprising:
an exterior surface and
an enclosed interior cavity defined by inwardly facing surfaces, the enclosed interior cavity comprising a lattice of intersecting rod structures within and supporting the interior cavity, wherein the cutting tool is selected from the group consisting of a drill, reamer and endmill.

9. The cutting tool of claim 8, wherein the cutting tool is a drill or endmill and the cavity is in a cutting region of the drill or endmill.

10. The cutting tool of claim 8, wherein the lattice of intersecting rod structures extend between two or more of the inwardly facing surfaces.

11. The cutting tool of claim 8, wherein the cutting tool is formed of sintered cemented carbide.

12. The cutting tool of claim 11 having a final density greater than 95%.

13. The cutting tool of claim 11, wherein the sintered cemented carbide comprises metallic binder in an amount of 10 to 30 weight percent.

14. The cutting tool of claim 13, wherein the metallic binder comprises an alloying element selected from the group consisting of ruthenium, rhenium and molybdenum.

15. The cutting tool of claim 14, wherein the alloying additive is present in an amount of 10 to 30 percent of the metallic binder phase.

16. The cutting tool of claim 15, wherein the alloying additive exhibits hexagonal crystal phase.

17. The cutting tool of claim 8 further comprising a coating of one or more refractory materials, the coating be deposited by PVD, CVD or combinations thereof.

18. The cutting tool of claim 8, wherein the lattice of intersecting rod structures consist of cemented carbide.

19. The cutting tool of claim 18, wherein a hard particle phase of the cemented carbide has an average grain size less than 10 µm.

20. The cutting tool of claim 18, wherein a hard particle phase of the cemented carbide has an average grain size of 0.5-3 µm.

* * * * *